US009824081B2

(12) United States Patent
Lehmann et al.

(10) Patent No.: US 9,824,081 B2
(45) Date of Patent: *Nov. 21, 2017

(54) MANIPULATING SPREADSHEET DATA USING A DATA FLOW GRAPH

(71) Applicant: SAP SE, Walldorf (DE)

(72) Inventors: Claudia Lehmann, Palo Alto, CA (US); Michael Alexander, Palo Alto, CA (US); Phil Tinari, Palo Alto, CA (US); Min He, San Jose, CA (US); Vei Ming Seah, Palo Alto, CA (US); Barbara Stortz, Walldorf (DE); Daniel Culp, Palo Alto, CA (US)

(73) Assignee: SAP SE, Walldorf (DE)

( * ) Notice: Subject to any disclaimer, the term of this patent is extended or adjusted under 35 U.S.C. 154(b) by 257 days.

This patent is subject to a terminal disclaimer.

(21) Appl. No.: 14/701,369

(22) Filed: Apr. 30, 2015

(65) Prior Publication Data

US 2016/0321231 A1    Nov. 3, 2016

(51) Int. Cl.
*G06F 17/24* (2006.01)
*G06T 11/20* (2006.01)

(52) U.S. Cl.
CPC .......... *G06F 17/246* (2013.01); *G06T 11/206* (2013.01); *G06T 2200/24* (2013.01)

(58) Field of Classification Search
CPC .................. G06F 17/246; G06F 17/30539
See application file for complete search history.

(56) References Cited

U.S. PATENT DOCUMENTS

| | | | | |
|---|---|---|---|---|
| 2008/0162532 | A1* | 7/2008 | Daga | G06F 17/30554 |
| 2008/0222510 | A1* | 9/2008 | Nguyen | G06Q 10/10 715/212 |
| 2012/0137203 | A1* | 5/2012 | Schodl | G06F 17/246 715/215 |
| 2013/0086459 | A1* | 4/2013 | Folting | G06F 17/246 715/212 |

* cited by examiner

*Primary Examiner* — Asher Kells
(74) *Attorney, Agent, or Firm* — Fountainhead Law Group P.C.

(57) ABSTRACT

The present disclosure includes techniques pertaining to computer implemented systems and methods for automatic generation of data transformations. In one embodiment, a user manipulates a spreadsheet of data in a user interface. On a backend, the user's manipulations trigger actions that cause the data to be modified. Actions may automatically cause data flow objects and data flow graphs to be produced. The transformations defined by the data flow graphs are automatically executed by a software engine and the results are displayed to the user. The user may access and manipulate data from a variety of data sources while the underlying complexities of the transformation process are performed in an automated manner.

20 Claims, 22 Drawing Sheets

Fig. 4

∧ Actions on the worksheet  ~ 501

⬛ Show/Hide Columns

+ Add formula column

▦ Cleanse Worksheet

⬛ Remove duplicate records

▦ Remove Worksheet

▦ Duplicate Worksheet

↻ Refresh Data

⬆ Export this worksheet

▦ Actions History (Undo/Redo Actio...

*Fig. 5A*

∧ Modify Option  ~ 502

∨ Change Case

∨ Trim

∨ Replace

∨ Rename

∨ Remove

∨ Duplicate

∨ Clear

∨ Convert to Number

∨ Convert to Date

∨ Fill

∨ Combine

∨ Split

Actions History ~700

Create Worksheet
Mon, Mar 30, 2015, 09:07

Add Formula Column ⊗
Mon, Mar 30, 2015, 09:58
Column Name: COUNTRY2

Split on NAME_LINE ⊗
Mon, Mar 30, 2015, 10:22
Split string " ", New columns: NAME...

Rename on FIRST_NAME ⊗
Mon, Mar 30, 2015, 10:22
New Name: FIRST_NAME

Rename on LAST_NAME ⊗
Mon, Mar 30, 2015, 10:23
New Name: LAST_NAME

*Fig. 7A*

| COUN... | COUNTRY2 | NAME_LINE | FIRST_NAME | LAST_NAME ~702 |
|---|---|---|---|---|
| US | USA | JANE HARTLEY | JANE | HARTLEY |
| US | USA | BILL RAMESH | BILL | RAMESH |
| US | USA | BOB SCHMIDT | BOB | SCHMIDT |
| US | USA | JONATHAN RO... | JONATHAN | ROBERT CRAFT |
| US | USA | THOMAS FRED... | THOMAS | FREDERICK KEY |
| US | USA | PAMELA COOK | PAMELA | COOK |
| US | USA | SHERI L MARE... | SHERI | L MARENCHT |
| US | USA | GLORIA VAHA... | GLORIA | VANARSDALE |
| US | USA | NANCY MCNA... | NANCY | MCNARY |
| US | USA | MICHELE MAT... | MICHELE | MATTHEWS |
| US | USA | NANCY A RICH... | NANCY | A RICHARY |
| US | USA | DEREK WRIGHT | DEREK | WRIGHT |
| US | USA | DAN SAGE | DAN | SAGE |
| US | USA | JERRY E STUR... | JERRY | E STURNER |
| US | USA | GLORIA VAHA... | GLORIA | VANARSDALE |
| US | USA | ARTHUR HELD... | ARTHUR | HELDON |
| US | USA | DONALD PAUL... | DONALD | MULDER |

*Fig. 7B*

MANIPULATING SPREADSHEET DATA USING A DATA FLOW GRAPH

CROSS REFERENCE TO RELATED APPLICATIONS

The present application contains subject matter related to the subject matter in concurrently filed U.S. patent application Ser. No. 14/701,387, entitled "Computer Implemented Systems and Methods for Data Usage Monitoring," the content of which is hereby incorporated herein by reference. The present application contains subject matter related to the subject matter in concurrently filed U.S. patent application Ser. No. 14/701,405, entitled "Computer Implemented Systems and Methods for Transforming Data," the content of which is hereby incorporated herein by reference.

BACKGROUND

The present disclosure relates to computing and data processing, and in particular, to computer implemented systems and methods for automatic generation of data transformations.

Historically, business users analyzed their businesses using individual spreadsheets of data. As organizational complexity increased, hundreds or even thousands of such spreadsheets may be generated across an organization containing data for a wide range of activities such as finance and accounting, manufacturing, and sales, etc.

Eventually, transactional databases and other forms of data stores were used to capture high speed transactional and operational data, such as ticket sales, parts inventories, and the like. Typically, a transactional database operates on logical units of work ("transactions") that contain one or more SQL statements, for example, which may read, write, or update data.

To gain access to the above spreadsheets and transactional data for analysis purposes, the data had to be moved from the spreadsheets and transactional databases to an analytic database such as a data warehouse or data mart, where business users could generate user specific queries to derive meaning and business intelligence from the data.

However, data warehousing is problematic because multiple different users are required to move the data from the transactional databases to analytic databases, such as data warehouses, which may have a significantly different storage structure for storing the data. For example, if a business analyst desires particular data that is not available in an analytic database, the business analyst may typically submit a request to the IT department to move desired data into the data warehouse. IT users with special software training may use complex extraction, transformation, and loading tools to obtain the data that meets the business analyst's needs, a process which can be burdensome, time consuming, and may require multiple iterations. Additionally, important data stored in spreadsheets may be spread across an enterprise making it difficult to track, access, and load by an IT organization to meet the needs of different business users.

Accordingly, existing techniques for making transactional data available to business users are often inadequate and inefficient.

SUMMARY

The present disclosure includes techniques pertaining to computer implemented systems and methods for automatic generation of data transformations. In one embodiment, a user manipulates a spreadsheet of data in a user interface. On a backend, the user's manipulations trigger actions that cause the data to be modified. Actions may automatically cause data flow objects and data flow graphs to be produced. The transformations defined by the data flow graphs are automatically executed by a software engine and the results are displayed to the user. The user may access and manipulate data from a variety of data sources while the underlying complexities of the transformation process are performed in an automated manner.

The following detailed description and accompanying drawings provide a better understanding of the nature and advantages of the present disclosure.

BRIEF DESCRIPTION OF THE DRAWINGS

FIG. 4 illustrates data presented to a user in a spreadsheet according to an embodiment.

FIGS. 5A-B illustrate actions that may be performed on worksheets according to an embodiment.

FIGS. 6A-B illustrate a formula column editor according to an embodiment.

FIGS. 7A-B illustrate an actions history in a UI according to an embodiment.

DETAILED DESCRIPTION

Described herein are techniques for computer implemented systems and methods for automatic generation of data transformations. The apparatuses, methods, and techniques described below may be implemented as a computer program (software) executing on one or more computers. The computer program may further be stored on a tangible non-transitory computer readable medium, such as an electronic memory or storage disk, for example. A computer readable medium may include instructions for performing the processes described below. In the following description, for purposes of explanation, numerous examples and specific details are set forth in order to provide a thorough understanding of the present disclosure. It will be evident, however, to one skilled in the art that the present invention as defined by the claims may include some or all of the features in these examples alone or in combination with other features described below, and may further include modifications and equivalents of the features and concepts described herein.

Architectural Overview

Figure 1:
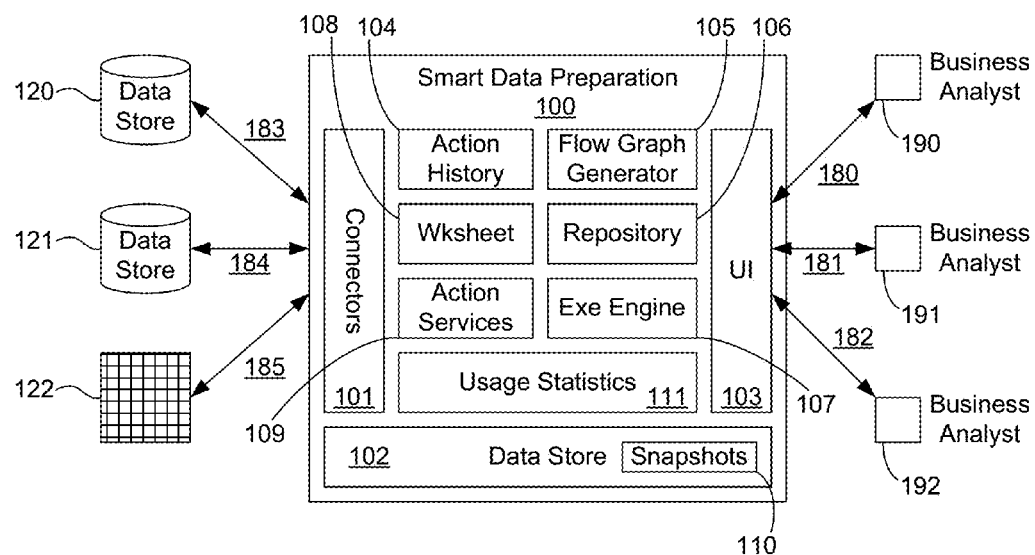
FIG. 1 illustrates a computer system for automatically generating data transformations according to one embodiment.

FIG. 1 illustrates a computer system for automatically generating data transformations according to one embodiment. Features and advantages of the present disclosure include a computer system that allows business analysts (or business users) to access and manipulate transactional data directly without requiring complex and burdensome data preparation by IT staff. For example, embodiments of the disclosure may allow business analysts with very little or no IT experience to access a plurality of data sources 120-122 directly from their local computers 190-192. A business analyst may login to a data preparation (DP) software system 100 as described herein, which allows the user to browse data sources 120-122 across one or more networks, connect to one or more data sources, retrieve data from the data sources, and manipulate the data in a simple spreadsheet presented to the business analyst over a user interface component 103. As used herein, a spreadsheet is a presentation of data in columns and rows and is also referred to herein interchangeably as a worksheet. The business analyst may perform high level manipulations on the data to generate reports or conduct data analysis. Under the covers, a computer system executing DP software system 100 automatically translates the users' high level manipulations to produces complex data flow graphs to retrieve, transform, and store the data. Data may be seamlessly presented to the user after each manipulation, creating the appearance of simplicity and ease of use necessary for a business user, where the complex data processing steps are embedded in various software components in DP software system 100.

DP software system 100 may execute on one or more hardware server computers, for example, which may reside in a data center such as a local or cloud computing system. Local computers 190-192 may communicate with DP 100 over a variety of data communication networks 180-182. DP may communicate with data sources 120-122 across one or more of the same or different data communication networks 183-185, for example. DP 100 includes a connections component 101 for establishing data connections to data sources 120-122. Data sources 120-122 may include databases, Excel spreadsheets, comma separated value files, or a variety of other types of structured data stores, for example. With the addition of an unstructured or semi-structured to structured converter, data sources may also include unstructured or semi-structured data sources, for example. Structured data typically refers to data that is organized according to a defined pattern, such as a table of columns and rows. Unstructured or semi structured data typically has no structure, varying structure, or limited patterns, not including tables of defined column fields and rows of records, for example.

DP 100 includes a data store 102 for storing data from data stores 120-122 locally. Data store 102 may include a local database, local in-memory storage, or other type of data storage mechanism for storing data. In one embodiment, DP 100 comprises virtual tables (described in more detail below) that establish links to particular remote data sources, for example, and particular tables and columns and other connectivity information to quickly and efficiently retrieve particular data sets from particular remote sources that have been selected by a user for retrieval into DP 100. Features and advantages of the present disclosure include a data source browser that allows a business user, with very little knowledge of network administration, to browse data sources across a wide range of networks, for example, to identify and select particular tables of data that may be useful in a highly customized analysis. The selected data may then be retrieved by DP 100 and stored locally in data store 102. In one embodiment, data selected by the user and received by DP 100 is stored as snapshot data 110 locally in data store 102, for example. Original versions of snapshot data 110 may be provided as inputs to a transformation engine to produce modified data sets (modified snapshot data) that are highly customized by the business analyst as described in more detail below. Original snapshots of data 110 from a variety of data sources 120-122 may be refreshed quickly and seamlessly in an automated manner using virtual tables to connect to and retrieve the original data sets in case such original data has changed. As described in more detail below, a business analyst may manipulate data at an intuitive level and the retrieval, transformation, and updating processes may happen automatically or with minimal input from the user, eliminating the need for IT personnel with advanced network administration skills.

DP 100 may include a user interface (UI) component 103. UI 103 may present data and interface elements to a user to produce a seamless easy to use experience for the user. For example, snapshot data 110 may be presented to the user as a simple spreadsheet. A variety of manipulations of the data may be presented to the user as simple buttons or menus as described in more detail below. A user may view the data selected from remote data sources directly in the spreadsheet and perform a variety of simple data manipulations to massage the data into a form useful to the user. The data manipulations (or actions) are received as user triggered inputs by UI 103 and the inputs produce actions in DP 100 that may result in complex data processes as described herein. For example, DP 100 includes action services 109 that may receive the user trigger inputs and perform a wide variety of complex actions in response to a user's spreadsheet manipulations captured via UI 103.

Features and advantages of the present disclosure include a flow graph generator 105 that generates data flow graphs based on the actions triggered by a user's manipulation of the spreadsheet. For example, a data flow graph may comprise a plurality of data flow objects that each correspond to some low level operation on the data. Data flow objects may include a read object to read particular data, a write object to write a data output, projection, union, join, match, cleanse, best record, or geocode as just examples of the types of data operations that may be represented as data flow objects. The data flow objects may comprise metadata that describes particular data operations and may include parameters for configuring specific instances of the data operations, for example. The data flow objects are selected and arranged automatically by flow graph generator 105 in DP 100, for example, based on high level spreadsheet manipulation or actions and coupled together to form a data flow graph. DP 100 further includes a repository 106 for storing a plurality of data flow graphs for a particular user or for multiple users, for example. An execution engine 107 may retrieve a particular data flow graph from repository 106 and execute the data flow operations based on how they are connected together in the data flow graph. Accordingly, user's high level spreadsheet manipulations are translated into system actions, which are used to automatically produce customized data flow graphs that configure the engine to receive snapshot data from remote data sources and produce modified data sets that are customized directly by the business analyst and without time consuming and complicated support by IT staffing and network administration. This results in a faster and more efficient data analysis paradigm compared to previous approaches that required highly trained IT and network administration specialists to prepare remote data for use by business users.

As described in more detail below, features and advantages of the present disclosure may further allow a user to perform a number of spreadsheet manipulations and then view different states of the data in the spreadsheet with and without particular manipulations. For example, the user may be presented with a list of actions that have been performed in response to manipulations by the user, and the user may select one or more actions to be undone. The system automatically presents the user with the spreadsheet data as it would have been had the selected actions never occurred. If the user desires to return to any one of the later states after particular manipulations have been performed on the spreadsheet data, the user may simply select, via a user interface, to restore the undone actions, and the system automatically reproduces the data set with the undone actions now restored in the transformation process. Under the covers, a computer system executing DP 100 may execute an action history 104. As a user performs each manipulation on a spreadsheet, each corresponding action is stored in an action history data structure. As described below, the system may use the action history 104 to omit data flow objects from a data flow graph and return data flow objects to the data flow graph. Accordingly, if actions are undone, corresponding data flow objects are removed from the data flow graph and the engine 107 produces data results as if one or more manipulations had not occurred. If the undone actions are restored by the user, corresponding data flow objects are returned to the data flow graph and the engine 107 produces data results that include the user's manipulations. Accordingly, a user may perform a set of manipulations and walk backward in time to view previous results that omit the manipulations. A user may decide to reintroduce one or more of the omitted manipulations simply by selecting menu items. The action tracking, data flow graph generation, and transformation of the selected snapshot data sets into modified data result sets may all be handled automatically by DP 100, for example.

DP 100 may further include a worksheet definition component 108 to maintain information about particular worksheets (spreadsheets) being manipulated by each user. Example worksheet definitions are provided below.

Features and advantages of the present disclosure may further include a usage statistics module 111. As described below, usage statistics may allow IT staff and/or network administration to monitor usage statistics of DP 100. Examples of statistics, mechanisms for capturing such statistics, and data structures for storing such statistics are illustrated herein.

Figure 2:
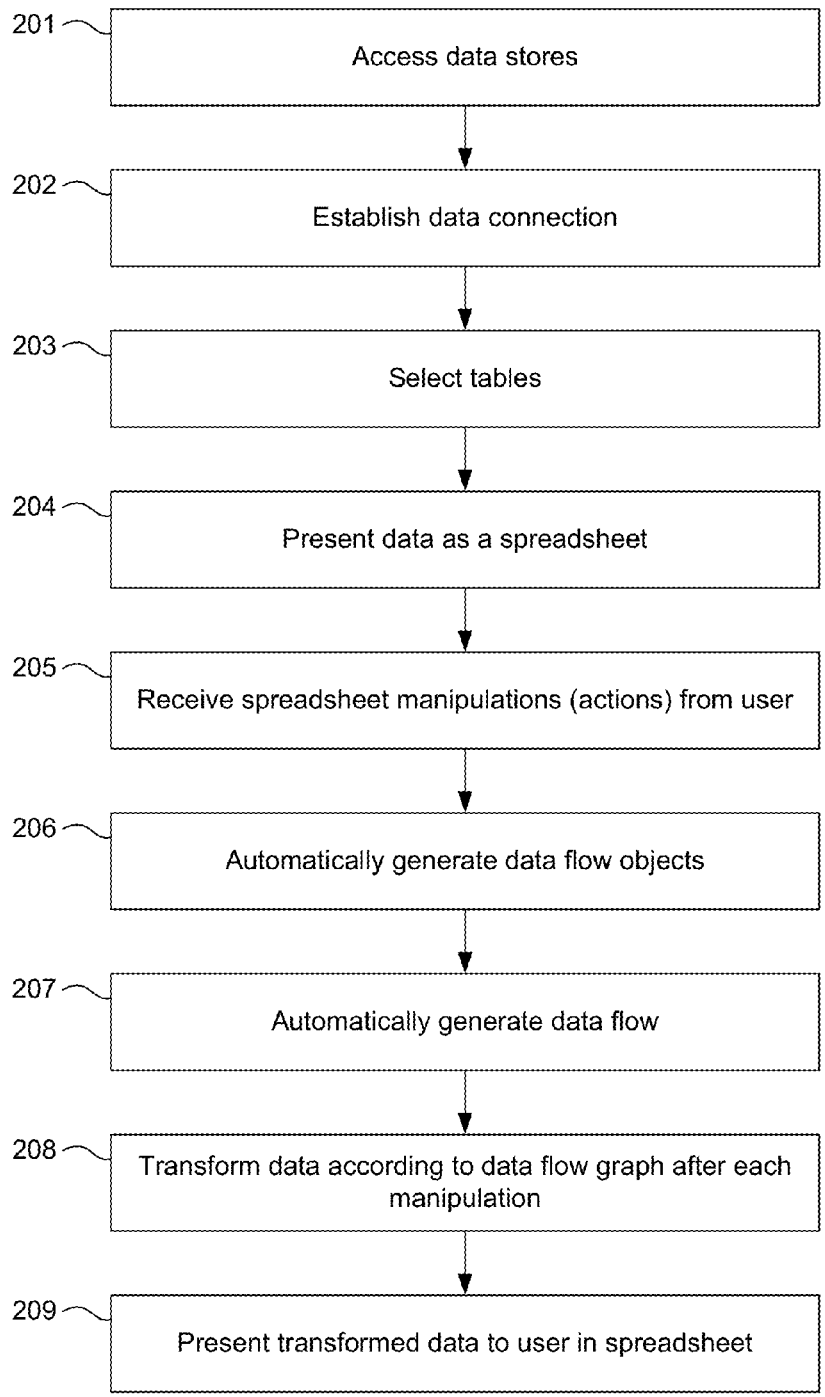
FIG. 2 illustrates an example method according to one embodiment.

FIG. 2 illustrates an example method according to one embodiment. As mentioned above, particular embodiments may include techniques for automating the retrieval, transformation, and storage of data. For example, at 201, the method may include accessing, on a computer system, a plurality of transactional data stores. Particular transactional data stores may be selected by a user through a network browser, for example, configured to identify different data store types operating on a plurality of computer systems on a plurality of networks. At 202, data connections may be established to selected transactional data stores. At 203, a user may select one or more particular tables of data in the plurality of transactional data stores, for example. The particular tables of data are extracted from the transactional data stores and the data from the selected tables is stored locally as snapshot data, for example. At 204, the data is presented as a spreadsheet to the user. The spreadsheet may comprise a plurality of columns and rows, for example. At 205, a plurality of spreadsheet manipulations, by the user, are received to transform the data in the spreadsheet. At 206, the DP system may automatically, in response to the spreadsheet manipulations, generate a plurality of data flow objects representing the spreadsheet manipulations. At 207, a data flow graph is automatically generated. For example, the data flow objects may be automatically configured to produce a data flow graph to cause data from the transactional data stores to be transformed according to the spreadsheet manipulations. At 208, the data is transformed after each of the spreadsheet manipulations by the user according to the data flow graph. At 209, the transformed data is presented to the user in the spreadsheet.

Example User Interface

Figure 3:
FIG. 3 illustrates a data source browser according to an embodiment.

FIG. 3 illustrates a data source browser according to an embodiment. In this example, browser 300 may allow users to search for and view a variety of data sources across a wide range of networks. In this example, tables 301 have been identified from remote data sources. Data from a particular table may be previewed at 302 in a preview pane in tabular form. As illustrated at 303, particular columns of the table may be selected for retrieval. The selection process is used to create a worksheet definition, for example, where data is retrieved from an external source table, stored locally (e.g., as snapshot data), and defined by a worksheet definition which may include a worksheet name, the name of columns in the worksheet, a link to the local data (e.g., original and modified), and a link to a virtual table that may be used to seamlessly reconnect to the remote data source to retrieve data updates, for example. As illustrated in FIG. 3, data browser 300 allows a business analyst to directly browse and preview a variety of data sources. The user may define and retrieve all or a subset of table data the business analyst might find useful. The selected data is then retrieved locally into the DP system.

FIG. 4 illustrates data presented to a user in a spreadsheet according to an embodiment. FIG. 4 shows a graphical user interface 400 generated by UI 103, for example, where columns and rows of data from one or more snapshots 110 are presented to a user. This example shows "Customers-US.xls" worksheet 401 from an Excel spreadsheet. Rows 401a include fields for country, name, title, address, and locality for example. UI 400 may include menu items to perform operations or obtain information on a project at 402, a particular worksheet 403, and perform actions on the worksheet at 404. Example actions that a business user may perform include show/hide columns, adding a formula (e.g., where a new column of values are a function one or more other columns of values), cleansing the worksheet data, removing duplicates, and others as shown, including an action history as mentioned above. Data statistics may also be invoked at 405 as described in more detail below.

FIGS. 5A-B illustrate actions that may be performed on worksheets according to an embodiment. FIG. 5A illustrate worksheet level actions. Worksheet level actions 501 operate on the entire worksheet and may include, for example, show/hiding columns, adding a formula column, cleansing a worksheet, removing duplicate records, removing a worksheet, duplicating a worksheet, refreshing data, exporting a worksheet, or accessing an action history. FIG. 5B illustrates column level actions. Column level actions 502 include changing a case, trim, replace, rename, remove, duplicate, clear, convert to number, convert to date, fill, combine, and split, for example. As described below, column level actions and worksheet level actions may be tracked in different ways.

Figures 6A, 6B:
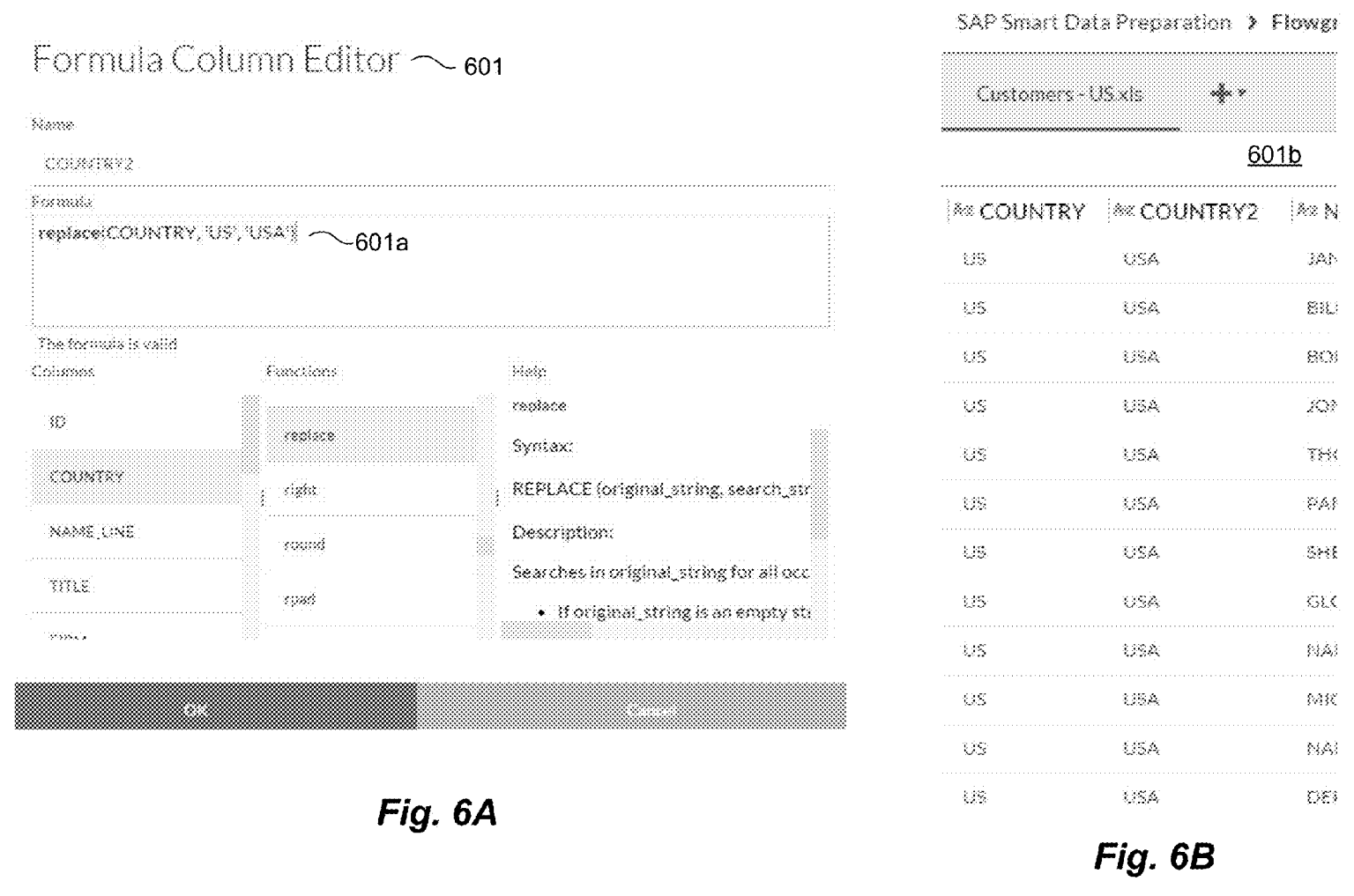

FIGS. 6A-B illustrate a formula column editor 601 according to an embodiment. This example illustrates one technique for manipulating a column. Here, a formula is used to transform US to USA in the COUNTRY column. The result is shown with the original at 601b. A variety of formula can be used by selecting one or more columns in the UI window and selecting functions to be applied. On the backend, user manipulations in the UI are translated into actions. The actions are, in turn, translated into data flow objects and included in a data flow graph automatically.

FIGS. 7A-B illustrate an actions history 700 in a UI according to an embodiment. Features and advantages of the present disclosure include tracking actions triggered by user manipulations of data in a worksheet 702. In this example, a worksheet has undergone several actions by a user. For example, first the user created the worksheet and a corresponding action on the backend DP software recorded the action in the action history. Next, a formula column was added and the action was logged in the action history. The action history captured a subsequent series of actions including splitting the NAME_LINE column, renaming the FIRST_NAME column, and renaming the LAST_NAME column, for example. The actions in the action history 104 of FIG. 1 may be accessed and displayed to a user sequentially. The actions may be undone or restored as describe below.

Figure 8B:
FIGS. 8A-B illustrate undoing and restoring actions according to an embodiment.
Figure 8A:

FIGS. 8A-B illustrate undoing and restoring actions according to an embodiment. In FIG. 8A, the actions from the action history displayed in FIG. 7A have been sequentially undone one at a time by clicking buttons 801. As illustrated in FIG. 8B, one or more of the undone actions may be restored with a click on buttons 802.

Figure 9:
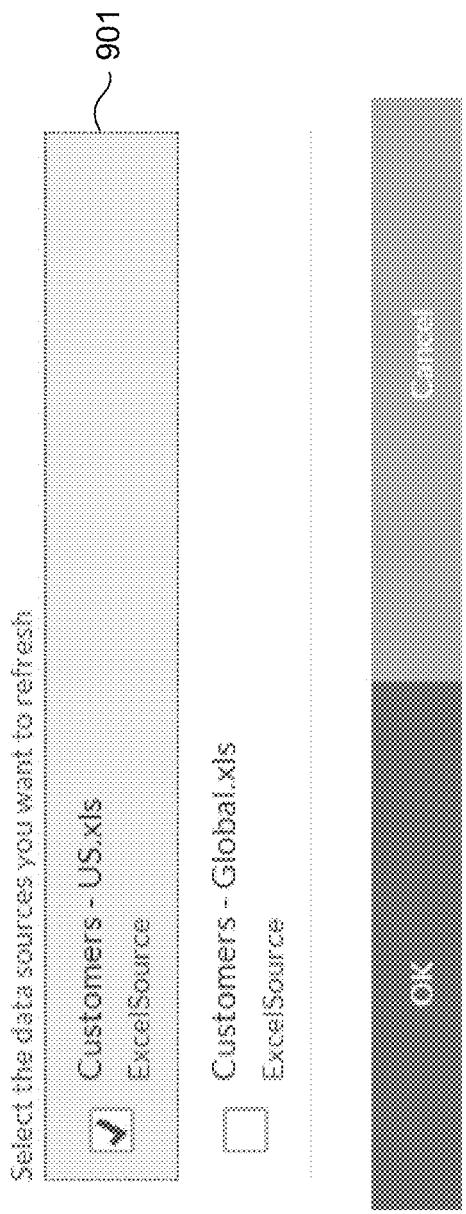
FIG. 9 illustrates a refresh data user interface according to an embodiment.

FIG. 9 illustrates a refresh data user interface 900 according to an embodiment. Features and advantages of the present disclosure allow a user to refresh local versions of data stored in the DP storage (e.g., as snapshots). For example, a user may select and retrieve a particular table from a remote data source at 901. The user may manipulate the data over some time period to massage the data into a useful form. After the user is satisfied with the combination of manipulations and corresponding data flow that is automatically generated to produce an output data set, the user may save the worksheet. At some later time, the data in the source may have changed. Accordingly, the user may select particular tables to refresh and the new data from the source is automatically retrieved by the DP software and stored as a new snapshot of original data for use as an input to the data flow. The output of the data flow is a revised output data set reflecting changes in the input data set. As mentioned above, snapshot data may be accessed from remote source tables through virtual tables. A virtual table may store connection information and information to retrieve data corresponding to a particular snapshot table stored locally on the DP computer system from a remote data source. By selecting a particular table in refresh data menu 900 and selecting OK, the follow steps are then performed automatically: A retrieve data action is automatically generated in the DP system. The retrieve data action may include information about the particular table selected by the user (e.g., Customers—US.xls). The action, in turn, accesses a virtual table in the DP system corresponding to the selected table. Connection information is retrieved and the remote data source storing the selected table is identified and a connection is established. Data from the selected table is retrieved from the remote data source and stored locally as a new snapshot data in the DP system.

Figure 10:
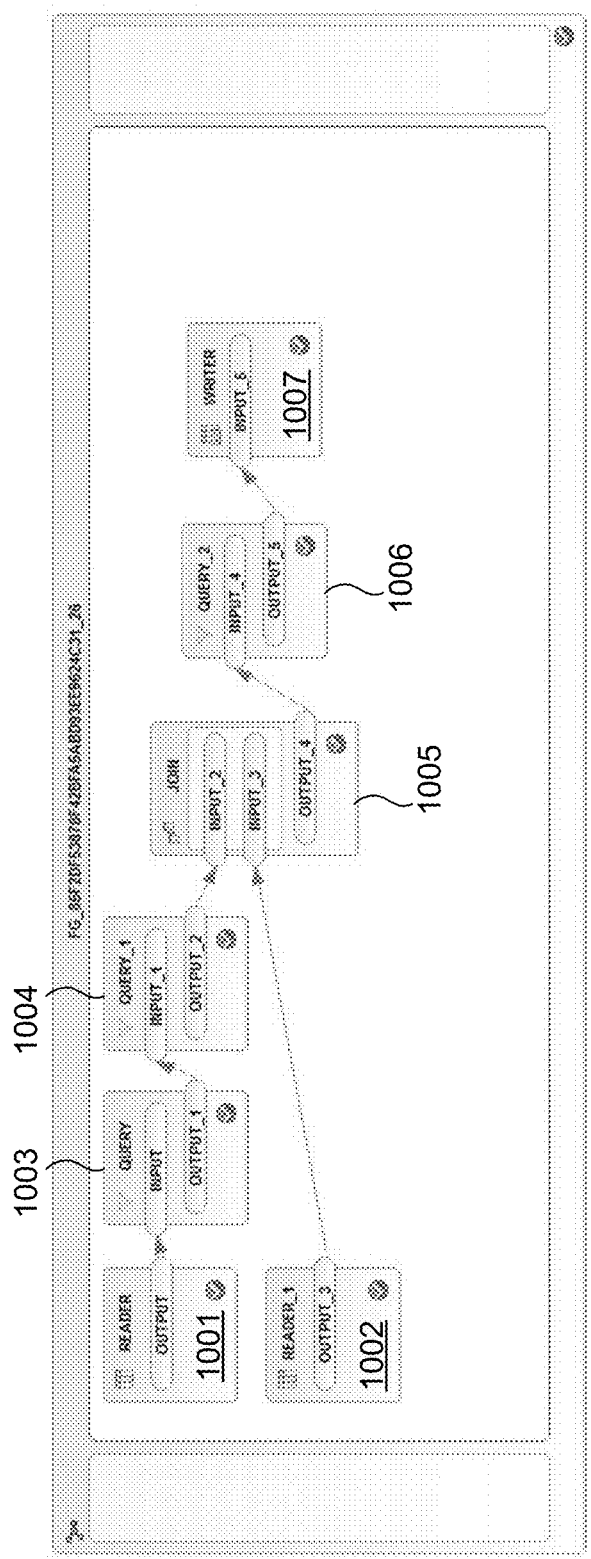
FIG. 10 illustrates a data flow objects and a data flow graph according to an embodiment.

FIG. 10 illustrates a data flow objects and a data flow graph according to an embodiment. As mentioned above, when a user selects various menu options to manipulate data in a worksheet, the user's actions trigger DP system actions that may automatically invoke data flow objects corresponding to the data manipulations. In this example, a user's manipulations have caused the DP system to invoke the following data flow objects: reader objects 1001 and 1002, query objects 1003 and 1004, a join object 1005, another query object 1006 and a writer object 1007. The collection of data flow objects according to a particular arrangement is a data flow graph that receives input data, processes the input data according to the arrangement of data flow objects, and produces an output data set.

Initially, when a user loads a worksheet in the user interface, the system may automatically invoke a reader data flow object, a query data flow object, and a writer data flow object to retrieve data from an original snapshot, select portions of the data, and write the data to an output snapshot, respectively, for example. The data flow objects are automatically selected and arranged in a data flow graph by the system. As the user manipulations generate further DP system actions, which invoke additional data flow objects, the DP system automatically reconfigures the data flow graph to incorporate new data flow objects into the flow graph. For example, DP system may include code to define which DP actions map to which data flow objects (e.g., a refinement/formula on a column in DP maps to a projection node in the flow graph). As a specific example, if user has combined two worksheets in the UI, the DP system may translate this worksheet combination action to a JOIN transform data flow object in the flow graph. The configuration selected by the user in the DP UI is then forwarded to this node, for example. After each manipulation, the new data flow graph may be forwarded to an execution engine, and the original snapshot data set is processed by the engine according to the data flow graph to produce an output data set. The output data set may be displayed to the user in the UI so the user sees immediate results of each manipulation, for example.

Figure 11:
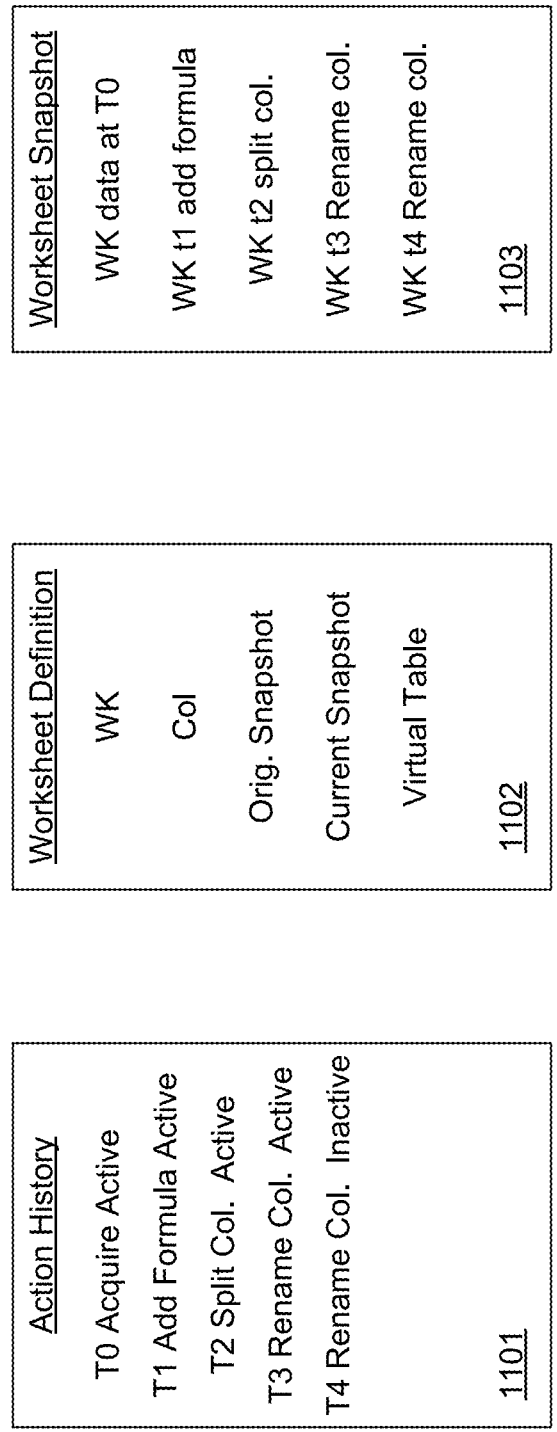
FIG. 11 illustrates example data structures according to an embodiment.

FIG. 11 illustrates example data structures according to an embodiment. This example illustrates an action history 1101, worksheet definition 1102, and a worksheet snapshot 1103. Action history 1101 may comprise a data structure for storing information about DP system actions. For example, action history 1101 may include the name of an action (e.g., "Acquire") together with a time stamp ("T0") and an "active/inactive" flag indicating if the action is active or inactive. As described more below, some actions may be omitted and reactivated using the flag in the action history, for example. Other actions in the action history may include "Add Formula" at time T1, "Split Column" at time T2, "Rename Column" at time T3, and "Rename Column" at time T4, for example. Accordingly, as a user manipulates the worksheet through the UI, the user's inputs trigger actions that are stored in action history 1101, possibly with a time stamp, for example. The action history 1101 may be implemented as a JSON object or table, for example.

DP system software may further include a worksheet definition 1102. Worksheet definition 1102 is one example data structure that may be used to retain information on worksheets being worked on by users, for example. In this example, the worksheet definition data structure 1102 may comprise a name ("WK"), information about particular columns in the worksheet (e.g., "Col"; column names), a link (e.g., a pointer) to an original snapshot where the worksheet input data is stored locally in the DP system, a link (e.g., a pointer) to an output snapshot where the worksheet output data is stored locally in the DP system, and a link to a virtual table for refreshing the original snapshot input data, for example.

Worksheet snapshot 1103 may store the actual data received from one or more remote data stores and stored locally on the system (i.e., data flow graph input data), as well as data output by the data flow graph. In this example, worksheet snapshot 1103 comprises worksheet data for worksheet name "WK" at time T0 (original data from remote sources). After an initial manipulation of the data by a user (e.g., Add Formula), an automatically generated flow graph produces an output data set at time T1 that includes the added formula. Similarly, at time t2 another output data set is generated that includes a split column. The output data set at time t2 may overwrite the data set produced at time t1, for example. Similarly, output data sets at time t3 and t4 are generated, where the output data snapshot from the flow graph at time t4 overwrites the output data snapshot generated at t3, for example.

Figure 12:
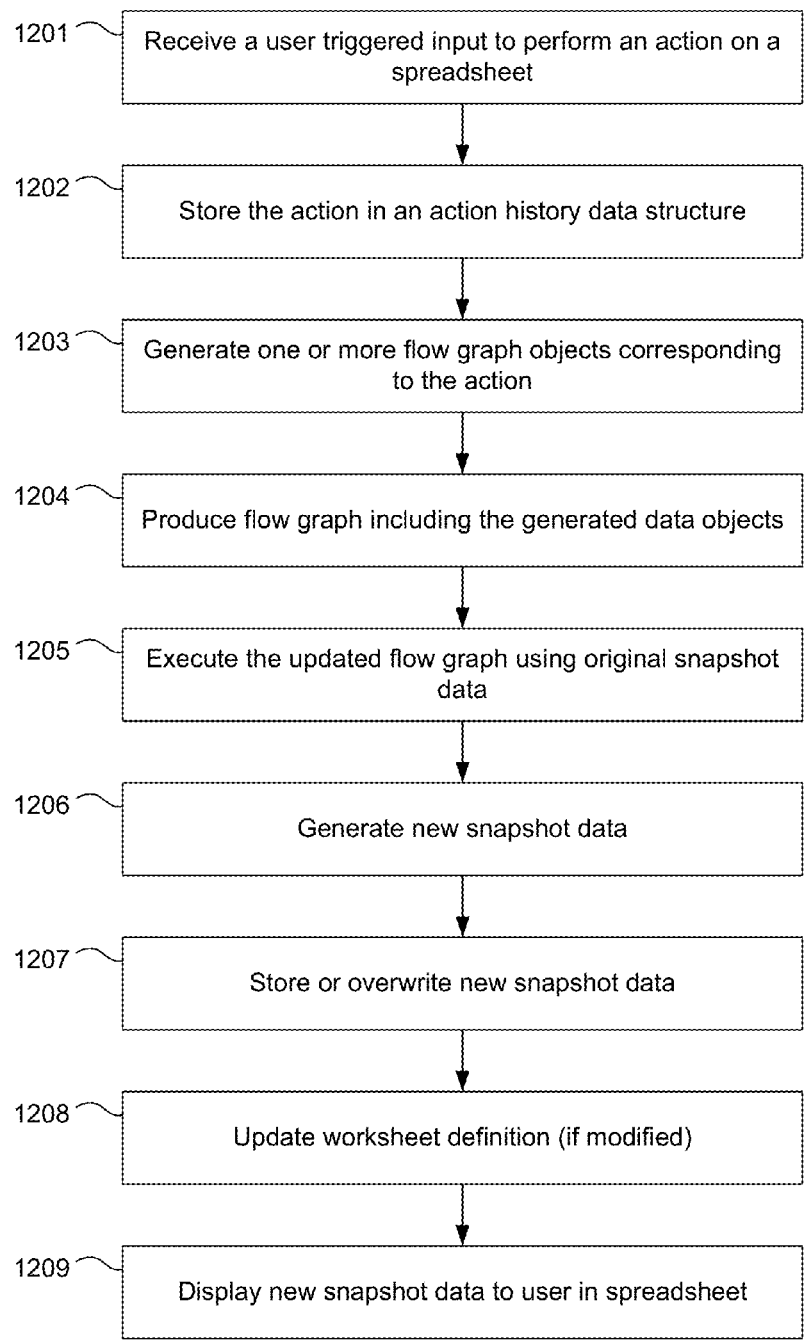
FIG. 12 illustrates a method of processing data according to an embodiment.

FIG. 12 illustrates a method of processing data according to an embodiment. Features and advantages of some embodiments may include automatically generating a flow graph to process snapshot data sets and produce output snapshot result data sets, for example. At 1201, user triggered inputs are received to perform an action on a spreadsheet. At 1202, the action is stored in an action history data structure. At 1203, one or more flow graph objects corresponding to the action are generated. For example, each action may have a corresponding specific algorithm for translating the action into one or more dataflow operations. In some embodiments, all required information about the action is stored so that the action can be reproduced later. The action is 'mapped' into flow graph operations. Some actions may include a single projection operation, but more complicated actions can be mapped into more complicated flows. For example, some complicated operation, such as deduplication, can expand into the following flow: projection, cleanse, match, projection, best record, projection, and union. During this mapping, columns may be added, deleted, or the type could be changed. Finally, additional flow graph operations to handle dependencies may be added, for example.

At 1204, the flow graph is produced with the one or more generated data flow objects. At 1205, the flow graph is executed using original snapshot data as on input. At 1206, new snapshot data is generated corresponding to the output of the flow graph. At 1207, the new snapshot data is stored. If existing snapshot data corresponding to a flow graph output already exists, such data may be overwritten, for example. At 1208, the worksheet definition may be updated if it was modified. For example, if new columns were created by the flow graph then the new column information may be recorded in the worksheet definition, for example. At 1209, new snapshot data is display to a user in the spreadsheet. Features and advantages of some embodiments may include generating new data using a data flow graph each time a user performs a manipulation and presenting the new data set to the user after each manipulation in the UI, for example.

Figure 13:
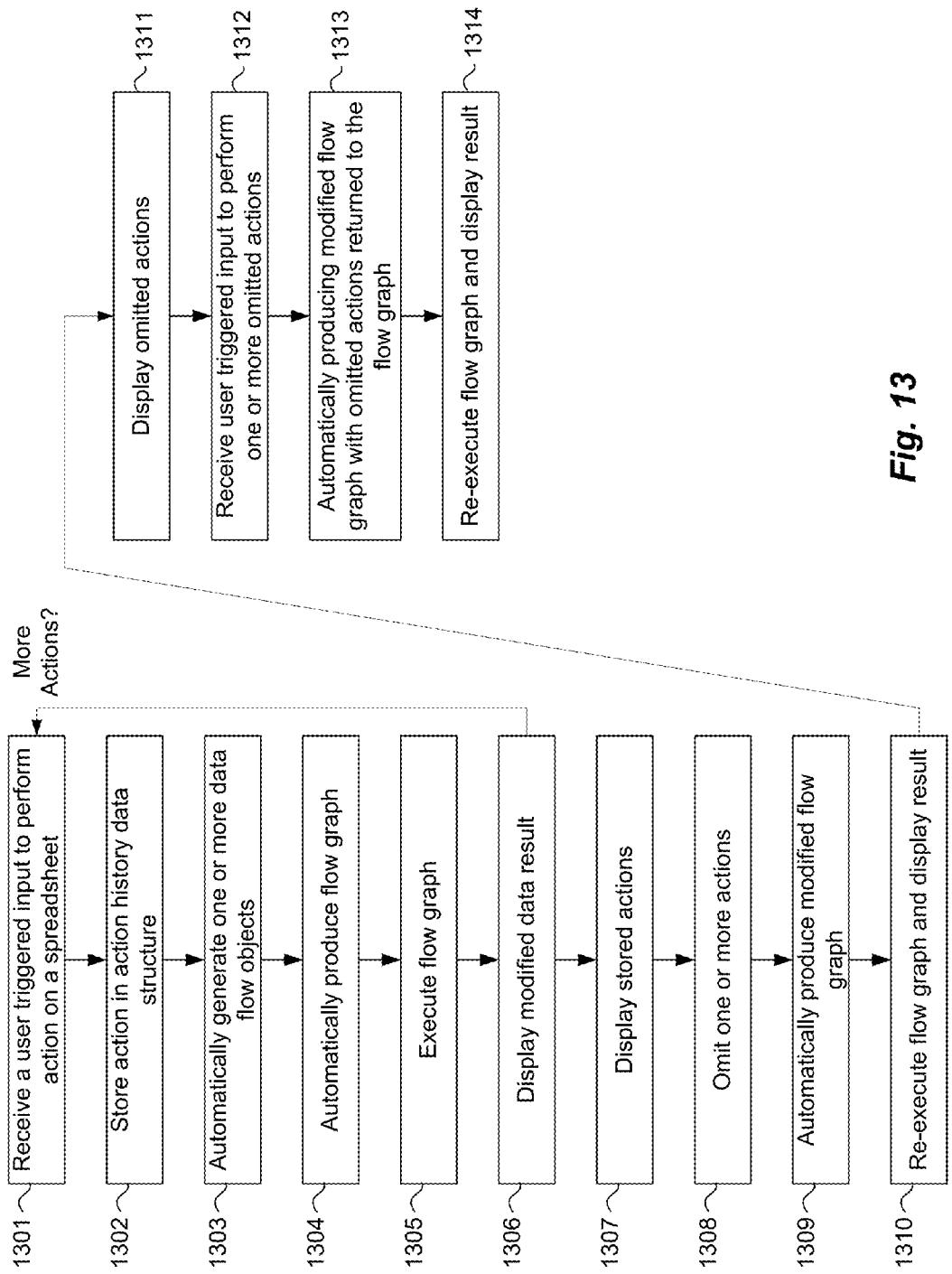
FIG. 13 illustrates a method of undoing and restoring actions according to an embodiment.

FIG. 13 illustrates a method of undoing and restoring actions according to an embodiment. Embodiments of the present disclosure may include code and data structures configured to allow a business user to perform a series of manipulations of a spreadsheet and then undo the actions to bring the spreadsheet data back into an earlier state. Additionally, if the user desires to restore one or more of the actions, the user can restore particular actions sequentially with a single menu button as shown in FIGS. 8A-B, for example. According to one embodiment, a process may include receiving a user triggered input to perform an action on a spreadsheet at 1301. The action may correspond to a user input on a UI interface on a remote computer and the user action triggers an action in a backend system (e.g., such as DP) operating on a different computer system, for example. At 1302, the action is stored in an action history data structure. The action history may provide a sequential record of what actions have occurred at what times, for example. At 1303, one or more data flow objects are automatically generated. At 1304, a flow graph is automatically produced. The flow graph includes the one or more data flow objects automatically generated in response to the action, for example. At 1305, the flow graph is executed and a new snapshot data set is produced. If there are more actions by the user, the process may repeat from 1301-1306, updating the user and displaying the output of the data flow graph each time an action occurs. If a user selects a menu item to view the actions, the stored actions in the action history may be displayed at 1307. At 1308, a user may select one or more actions from the action history to omit from the data flow graph process. The actions may be omitted according to a reverse sequence that the actions were performed, for example. At 1309, a modified flow graph is automatically produced in response to the user's selection to omit one or more actions. At 1310, the flow graph is re-executed and the output results are displayed to the user in the UI. At 1311, the omitted actions may be displayed to the user (e.g., as shown in FIG. 8B possibly with currently active actions). At 1312, a user may trigger the system through the UI to perform one or more of the omitted actions. The system receives a user triggered input and automatically produces a modified flow graph with the omitted actions returned to the flow graph. At 1313. At 1314, the flow graph is re-executed and the results are displayed to the user in a UI, for example. In one example embodiment, a worksheet definition (e.g., metadata about worksheet) holds the list of actions executed on a particular worksheet. Each action in an action history may include an "active" flag having states "active" or "inactive" which defines if the action is active or inactive as mentioned above.

Figure 14:
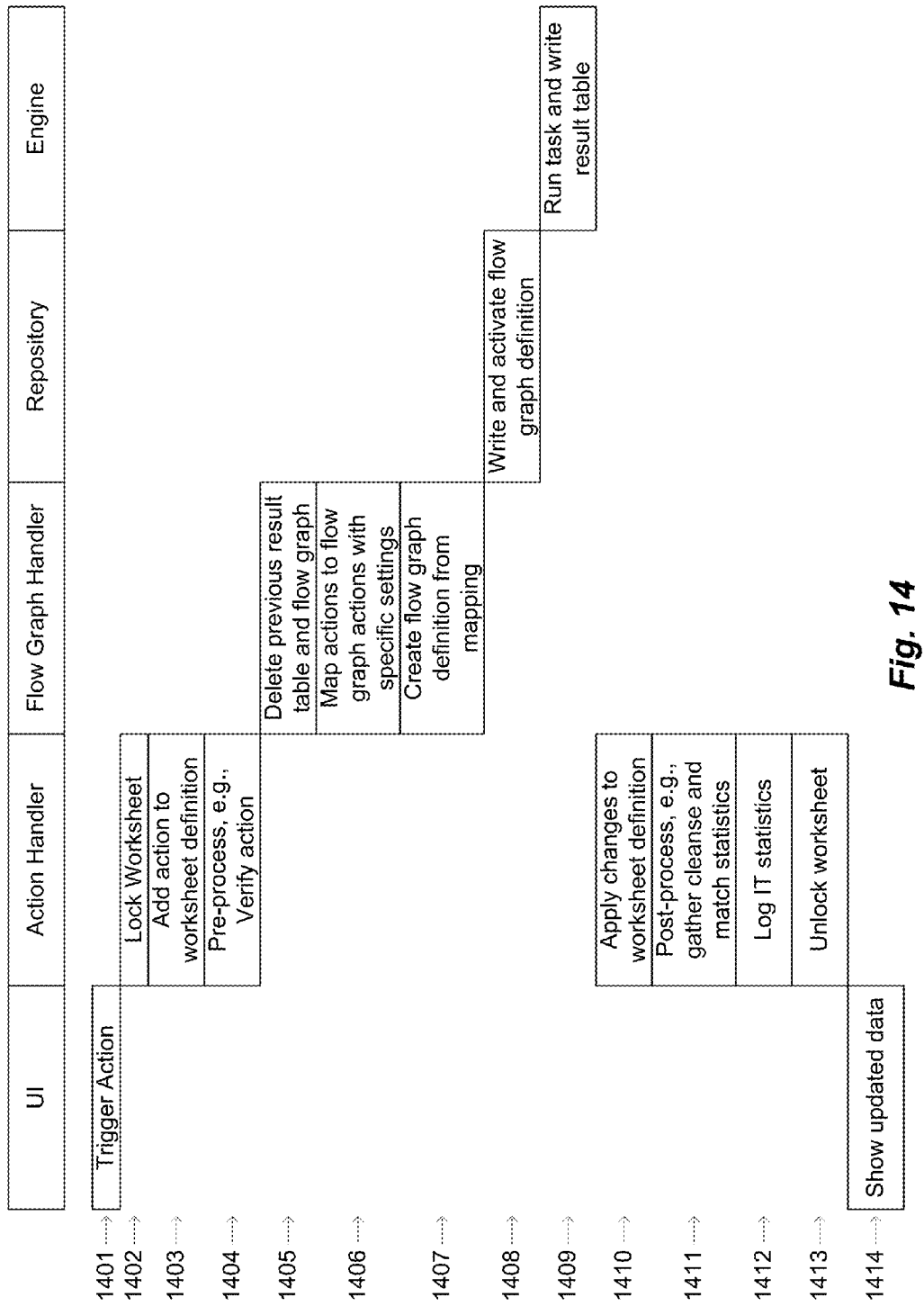
FIG. 14 illustrates another example method for allowing a business user to automatically generate data transformations according to another embodiment.

FIG. 14 illustrates another example method for allowing a business user to automatically generate data transformations according to another embodiment. At 1401, an action may be triggered. For example, a user interface (UI) software component may receive a signal indicating a user has performed a manipulation on worksheet data. At 1402, the worksheet may be locked by an action handler software component (e.g., action service 109 in FIG. 1). At 1403, action handler adds an action to the worksheet definition. At 1404, pre-processing may occur, which may include verifying the action, for example. At 1405, a flow graph handler software component (e.g., flow graph generator 105) may delete a previous result table and a previous flow graph, for example. At 1406, the flow graph handler may map one or more actions to flow graph actions (such as flow graph objects) with specific settings to implement the user's worksheet manipulations, for example. At 1407, the flow graph handler creates a flow graph definition from the mapping. The flow graph definition may include information specifying particular flow graph objects, connection information for the inputs and outputs of the flow graph objects, and specific settings/configuration information for each flow graph object, for example, which may be described using metadata, for example. At 1408, the flow graph definition (e.g., metadata describing the flow graph) may be written to a repository and activated. At 1409, a software execution engine may run a flow graph as a task. For example, the engine may retrieve the flow graph definition and an input data set (e.g., the input snapshot data) and transform the input data set as specified by the flow graph definition. The results are written to a result table (e.g., the output snapshot data). At 1410, the changes (if any) to the input data set from the data transformation performed by the engine are applied the worksheet definition by the action handler. At 1411, action handler may perform post-processing steps, which may include gathering, cleansing, and matching statistics, for example. At 1412, the statistics are logged by the action handler, as described in more detail below. At 1413, the worksheet is unlocked by that action handler. Finally, in this example, at 1414, the updated data is presented to the user by the UI. While the above example illustrates one example of how particular software components may perform the above steps, it is to be understood that the steps may be carried out by different software components than the ones described above.

Monitoring Usage Statistics

Features and advantages of the present disclosure include monitoring usage statistics. For example, in a Data Management System or Data Governance System, various manipulations or transformations can be applied to the data based on different business requirements. For example, transforming the data from lower case to upper case, combining several records to generate a new record, removing duplicate data records, cleansing data according to business standards, etc. Data can come from different resources, such as ERP or CRM, or various formats of files. Embodiments of the disclosure may include an efficient way of gathering and modeling all the usage information, to support various reporting and analysis requirements.

As an IT person for Data Management System or Data Governance System, it may be desirable to gather the data usage information such as, for example, what data are used frequently, how the data were manipulated or transformed, who viewed the data, etc. and generates reports and analysis on top of such information. Examples of desired usage statistics may include, for example, one or more of the following: report the number of each different type of data transformation or manipulation within a timeframe for a business defined dimension like project, to show what data are mostly used, analyze for a user or group of users, what data they commonly use and what they do with it, find the relationships between different data sources, tables, etc., to facilitate suggestion or recommendation in data enrichment (e.g., if two tables from different data sources are usually combined together, the next time one table is imported, the other table can be suggested to be combined with the first table).

To achieve efficient usage monitoring, a software system may have one or more of the following advantageous features, for example. First, the data usage information may be collected in different granularity levels. For example, the information may be gathered for different data sources (connections), different tables, and different table columns. Second, the data usage information may be related to multiple other dimensions, like users, time, and any business defined categories, like project, dataset, etc., to facilitate any further report, analysis, and prediction. Third, the data usage may be categorized based on different purposes of the usage, e.g., view the data, and all kinds of manipulations and transformations.

Embodiments of the present disclosure may collect as much data as possible, which means, for example, every single action on the data needs to be collected. The data usages may be categorized based on a combination of granularity levels and types of actions. For example, "combine two tables" is a table level action with type "combine," whereas "trim a data record" is a column (field) level action with type "trim". In one example application, an action on the data is served in a service call from client to server. A distributed data collection model is applied to collect data from each service call, and is used to gather the required information, like the granularity level, the type of action, who performed the action, the related business dimensions, the time of the action, etc. In one embodiment, the collected information may be stored in a way to be able to relate to multiple dimensions, and to be able to efficiently support any statistics report and analysis, for example. Accordingly, in one example implementation, a centralized fact table may be used to store the collected raw data, and the fact table may be linked to other dimension tables, for example.

Figure 15:
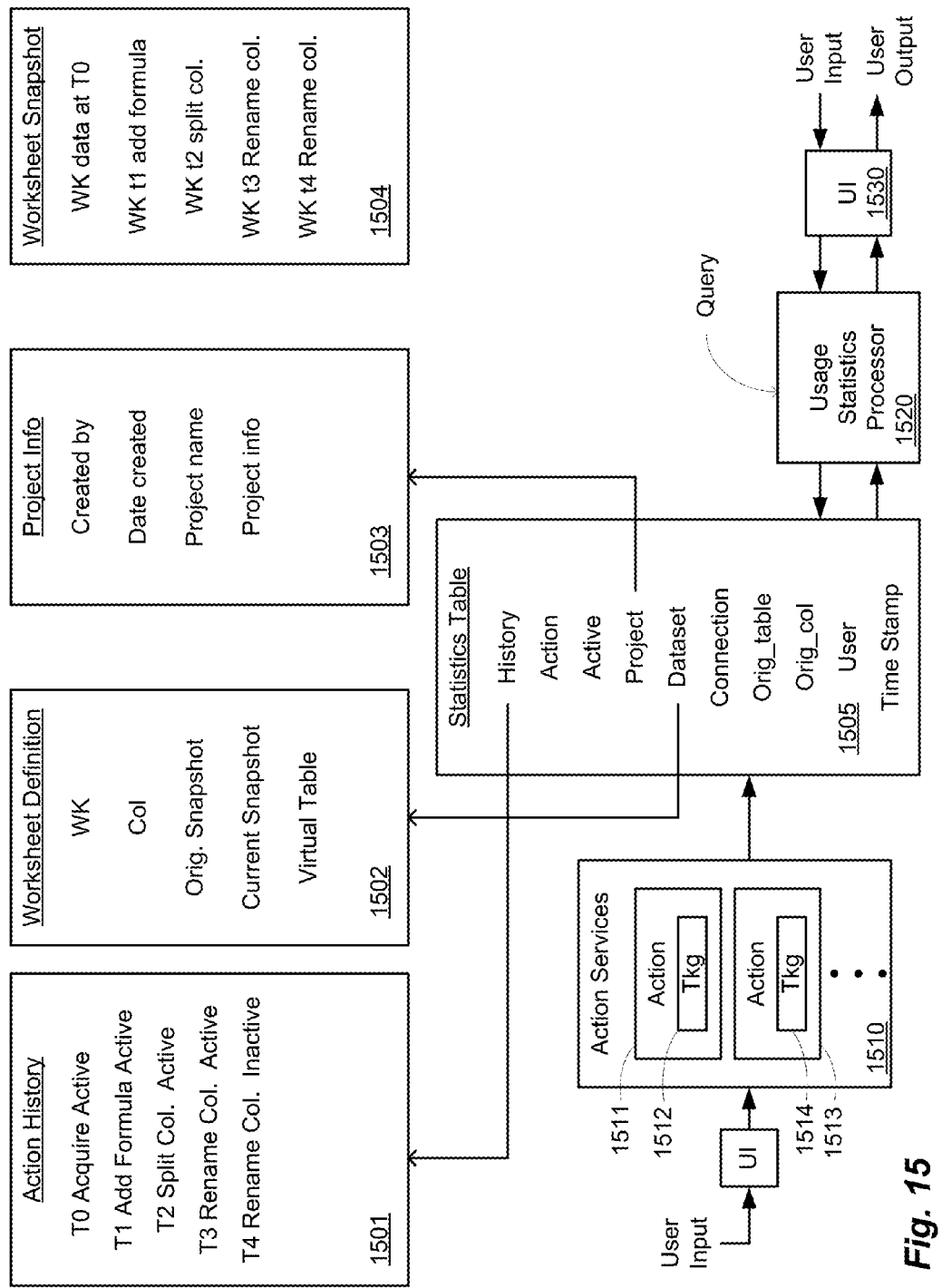
FIG. 15 illustrates an example architecture for monitoring usage statistics according to an embodiment.

In one embodiment, a computer system may include software components configured to track received actions corresponding to worksheet manipulations. The tracked actions may be stored as records in a data structure and linked to other data to generate usage statistics, for example. FIG. 15 illustrates an example architecture for monitoring usage statistics according to an embodiment. In this example, user triggered inputs are received via a UI and converted to actions. Action services 1510 (aka an action handler) may be used to invoke the various actions as users manipulate data in a worksheet via the UI, for example. In one embodiment, as each action is executed on each worksheet, data records are automatically generated to track each action. In this example, particular actions are implemented using different code blocks. For example, one action (e.g., a table level action) may be implemented using code block 1511, and another action may be implemented using code block 1513. In this example, the code block for each particular action comprising code for generating action specific data records. Accordingly, code block 1511 includes tracking code 1512 to generate data records when action 1511 is executed. Similarly, code block 1513 includes tracking code 1514 to generate data records when action 1513 is executed.

Appendix A is a listing of source code for example implementations of portions of action services 1510 to track usage at both the worksheet and column granularity levels. In Appendix A, "Prepare.prototype.addRecord" is a low level function to write to a statistics table (e.g., data storage structure 1505 in FIG. 15), which may be used by different action services, for example. Features and advantages of the present disclosure may include tracking actions/manipulations of data at different levels and granularity. For example, "Worksheet.prototype.addWorksheetFromHanaObject" may be a table level service that calls a function "logItStatsForAction", which in turn calls "AddRecord" to add a record to the data structure. As can be clearly seen by those skilled in the art, the code in Appendix A generates records including links to other data stored in the system, such as action history via the historyId, project data via the projectId, and worksheet definitions via the dataSetId, and information about an action via the action parameter, for example. In the example shown in Appendix A, the function APP.process request is called for every data manipulation triggered by a user. This function calls "applyColumnActions( )" with the particular operation (action service) that the user requested, which in turn calls "logItStatistics( )" to write to the table (e.g., table 1505). As illustrated in this example, worksheet level manipulations/actions and column manipulations/actions may have different tracking code blocks embedded in the action services to customize the records and associated data for these different actions. Accordingly, actions corresponding to worksheet manipulations have embedded code blocks for generating first data records and first associated data and actions corresponding to column manipulations have different embedded code blocks for generating second data records and second associated data.

As illustrated above, actions are executed and data records are generated automatically. Furthermore, the data records are automatically stored in a data structure 1505. In this example, the data structure is a table (e.g., statistics table 1505), which includes a history field (i.e., a link to the action history table), action information (e.g., name), an active field (e.g., to monitor whether the action was undone/restored), a project field (i.e., a link to a project information table). A dataset field (i.e., a link to a worksheet definition table), connection information (e.g., connection information about remote sources used to obtain tables or data sources), an original table field, an original column field, user information, and a time stamp. Action history table 1501, worksheet definition table 1502, and worksheet snapshots 1504 are described above. Project information data structure 1503 may include information about projects. Fields of the example table 1503 in FIG. 15 may comprise information about who created the project (created by), date created, project name, and other project information. The linking fields in the statistics table, as illustrated by this example, may be used to associate a wide range of additional data with the usage statistics.

According to embodiments described above, users may create numerous projects. Each project may include different data sets from different sources and process the data sets in different ways by manipulating worksheets as describe above. Accordingly, data records are generated and associated with action histories, worksheet definitions, project information, and other information, for example. Other users, such as users in an IT department, may access the usage information to analyze the usefulness of the data, for example. As illustrated in FIG. 15, user input such as menu selections may be receive through a UI 1530 and associated commands received by a usage statistics processor software component 1520. A query may be generated based on the user's selection of menu items in the UI, for example. The query may return data based on fields in statistics table 1505 and associated data from one or more of tables 1501-1503, for example. User interfaces for displaying resulting data are illustrated in FIGS. 17-23 below.

Figure 16:
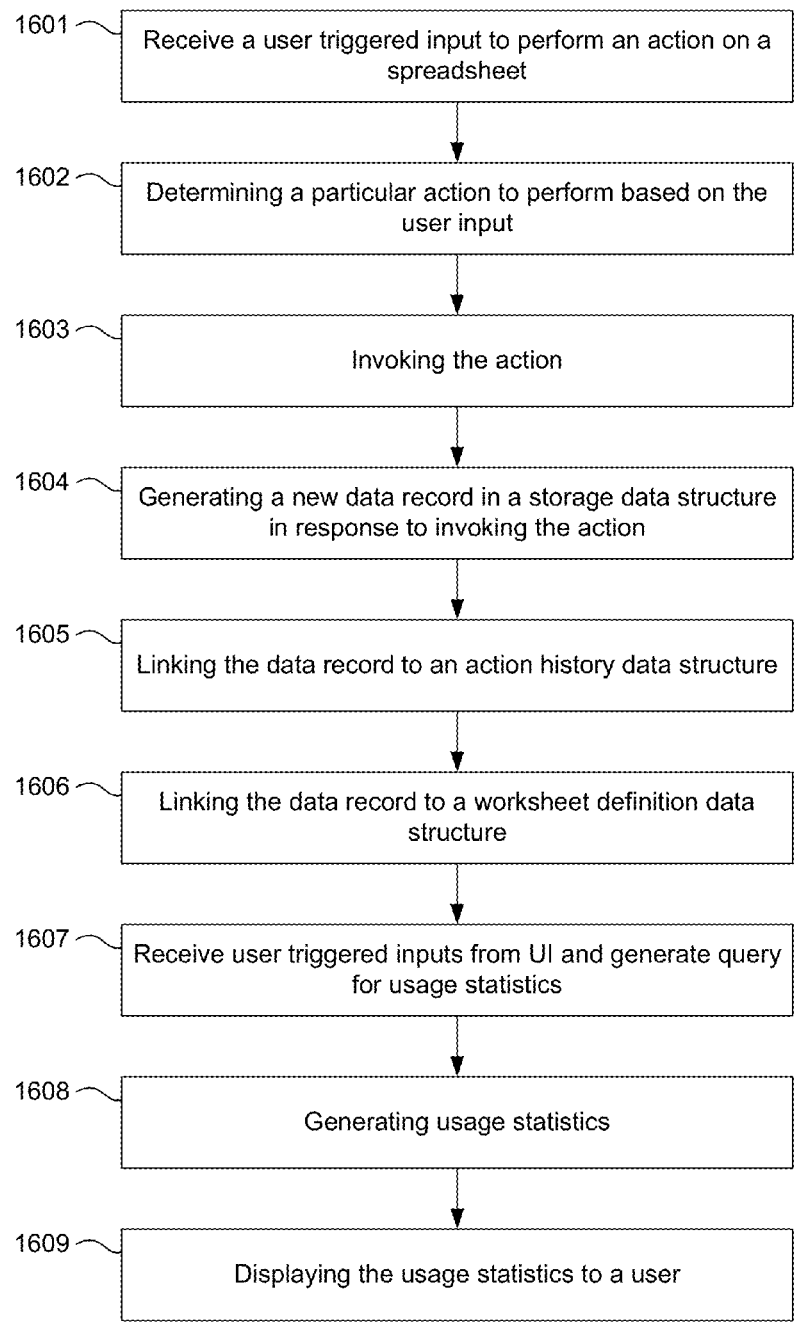
FIG. 16 illustrates example method steps for generating and accessing usage statistics according to an embodiment.

FIG. 16 illustrates example method steps for generating and accessing usage statistics according to an embodiment. At 1601, user triggered inputs are received to perform actions on a spreadsheet. At 1602, the system determines a particular action to perform based on the user input and particular actions are invoked at 1603, for example. At 1604, a new record in a storage data structure is generated in response to executing the action. As illustrated at 1605, the data record may be linked to an action history data structure. As illustrated at 1606, the data record may be linked to a worksheet definition data structure. At 1607, a user may access usage statistics through a user interface by selecting menu items, for example, which are translated into queries. At 1608, usage statistics are generated from data records in a statistics data structure and associated data, for example. At 1609, the usage statistics are displayed to a user.

Figure 17:
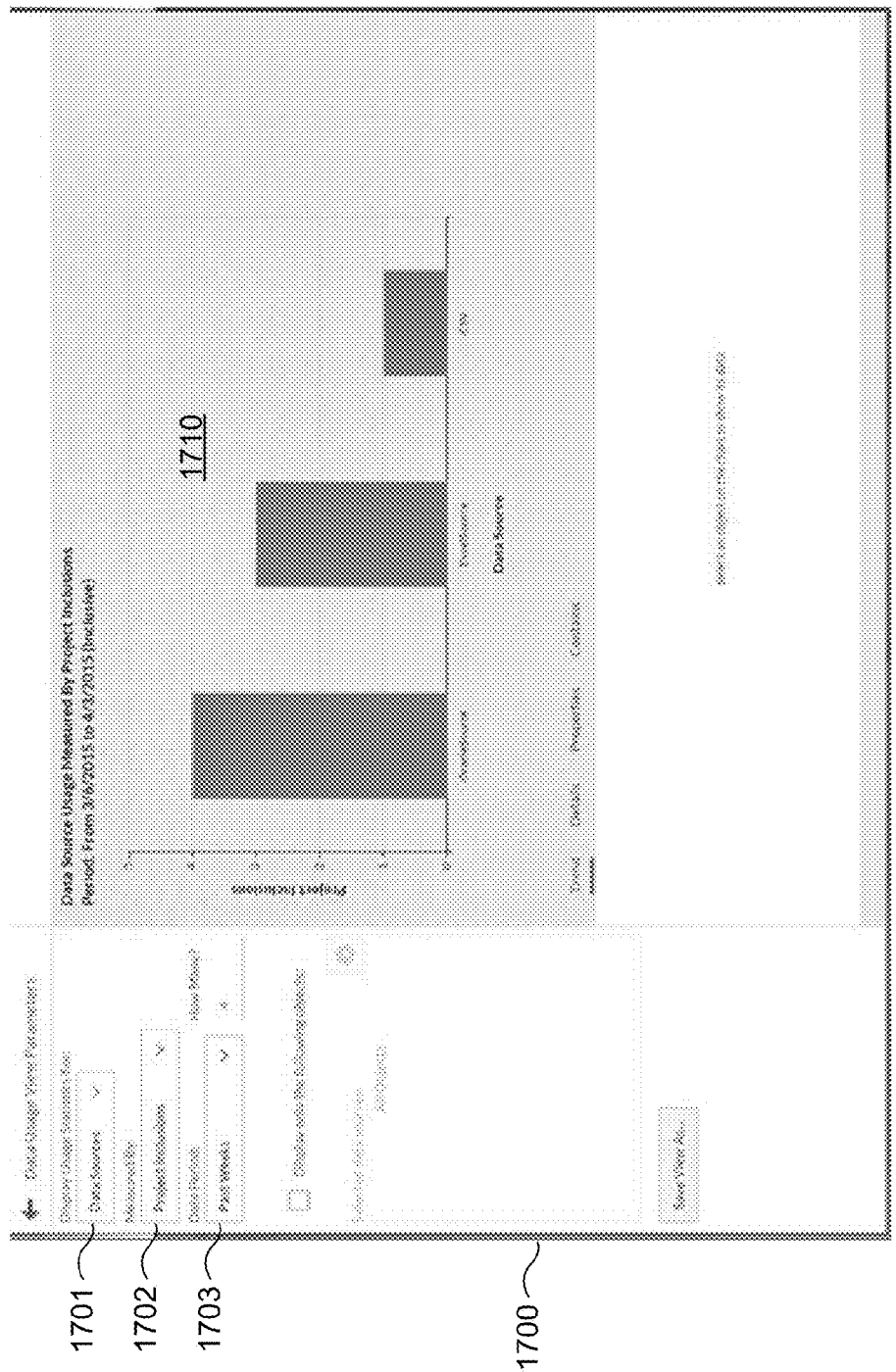
FIG. 17 illustrates a user interface for accessing usage statistics according to an embodiment.

FIG. 17 illustrates a user interface for accessing usage statistics according to an embodiment. One example user of usage statistics is an IT Administrator who may have a role of supporting a Business Analysts (BA) in their data needs. Features and advantages of the present disclosure include tools to help IT Administrators identify the most important data sets to the BA using two broad measures of usage, at various levels of aggregation, for example.

One way to determine relevance or importance of a data set is to determine how many times the BA includes a dataset in their projects. This is referred to as Project Inclusion. In some embodiments of the present system, business users organize their related data sets in Projects. Each Project is intended to help the user deal with a set of related data tasks. For example, a user might create a Project for sales in Europe, and another Project for the 2014 product line. When a data set is included in multiple projects, those actions imply that the data set has more value than one that is not included at all. So by counting and ranking project inclusions, embodiments of the disclosure help users identify the most valuable datasets.

FIG. 17 shows project inclusion at the highest aggregation level, which is the Data Source where the dataset resides. In this context, Data Source means the location of a set of data sets (e.g., tables of data). This is often a particular database or application server that hosts a collection of data sets. Users typically have data in many places, so this aggregation level gives a high level indication of which servers hold the most used datasets. UI 1700 includes menu selection items for selecting usage statistics. In this example, a user may select what to show usage statistics for at 1701 (in this case, Data sources), usage measurement 1702 (here, project inclusions), and a time range (or date range). The menu selections are used to generate a query to the usage statistics data structure on the backend system described above. The results may be presented in graphical form in UI 1700. In this example, a bar graph 1710 shows that the OracleSource has datasets that are included 4 times in various Projects, whereas CSV has only one dataset that has been included in a Project. Project inclusions may be determined, for example, by accessing project, connection, and action fields in statistics table 1505 of FIG. 5.

Figures 18, 19:
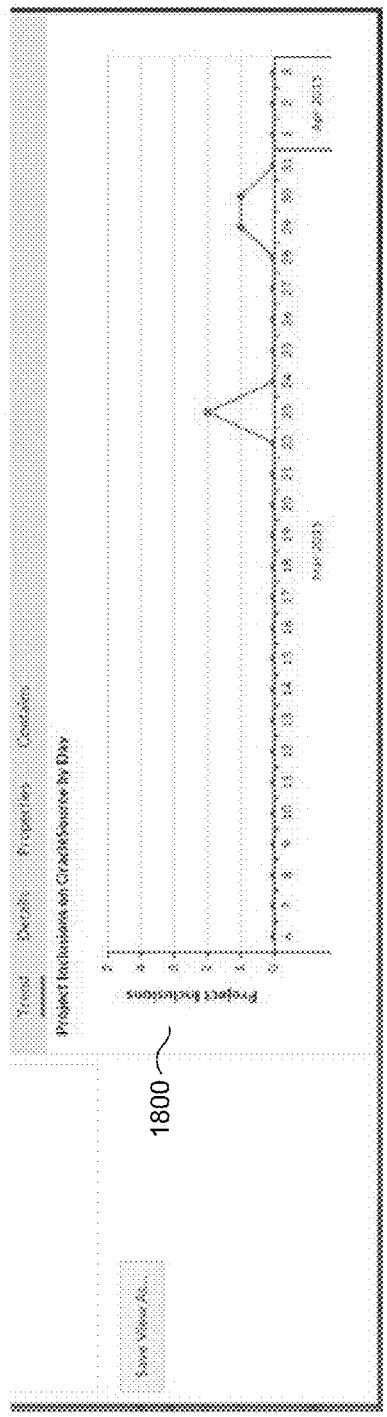
FIG. 18 illustrates a Trend tab according to an embodiment.
FIG. 19 illustrates a Details tab according to an embodiment.

To see more information about the OracleSource data source, the user may click on the OracleSource bar in the chart. FIG. 18 illustrates a Trend tab showing the daily usage over the period. Here, the plot 1800 shows that datasets from OracleSource were added to projects on 3 days (twice on 3/23 and once each on 3/29 and 3/30). This activity graph helps the user identify how current is the dataset that the BA is working with.

FIG. 19 shows a Details tab with more information about the specific datasets and the projects they were added to. As illustrated in table 1900, on 3/23, the SYSTEM user added DEPT and EMP to Project1. Of the 4 total inclusions, EMP was included 3 times into 2 projects. So the IT user may conclude that the EMP table has more value to the SYSTEM user relative to DEPT table, which was only included once.

Another measure of usage is to track what users are doing with the dataset. This is referred to as Data Manipulations. Business Analysts will often "massage" their raw datasets into something more useful to them. For example, they might combine different datasets into a larger dataset with more rows and/or columns. They might cleanse the dataset to correct bad data. They might change the part number field to all upper case letters.

By showing what Business Analysts are doing with the data, embodiments of the present disclosure help the IT user see how the data is manipulated. This provides data insight for the user, because a high number of manipulations may indicate that the data is valuable, because BAs want to do something with that data. A high number of manipulations can also indicate what can be done to improve the dataset in the future, so that the IT user can apply the same manipulations herself/himself before making it available to BAs, each of whom would otherwise have to do the same thing.

Figure 20:
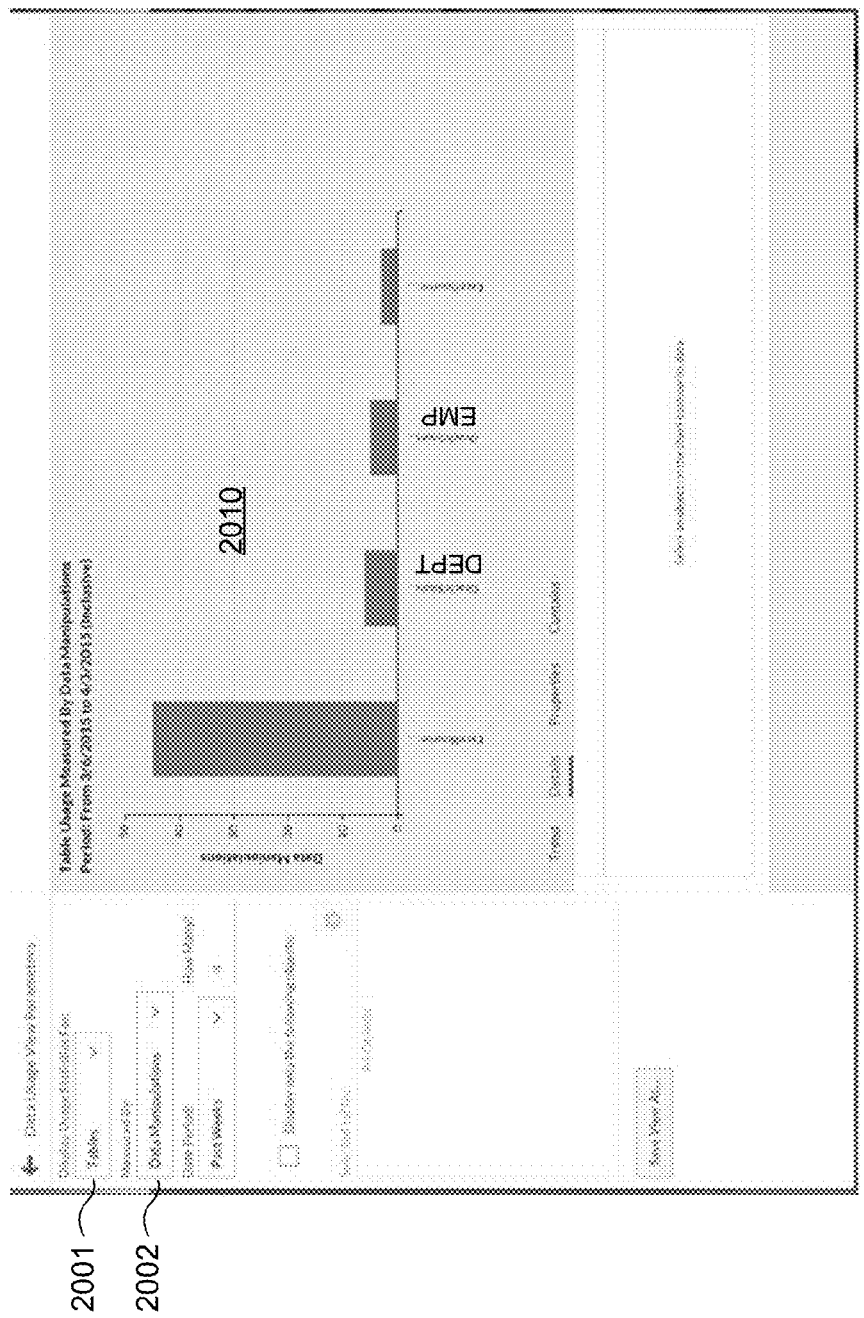
FIG. 20 illustrates an example UI for selecting usage information for data manipulations according to an embodiment.

The previous examples in the Figures above show the IT user that EMP and DEPT tables were included 4 times into 2 projects. But the IT user may like to know more about how those tables were used. FIG. 20 illustrates an example UI for selecting usage information for data manipulations according to an embodiment. In this example, the user may select "Tables" 2001 and "Data Manipulations" 2002 to see graph 2010, for example.

Figure 21:
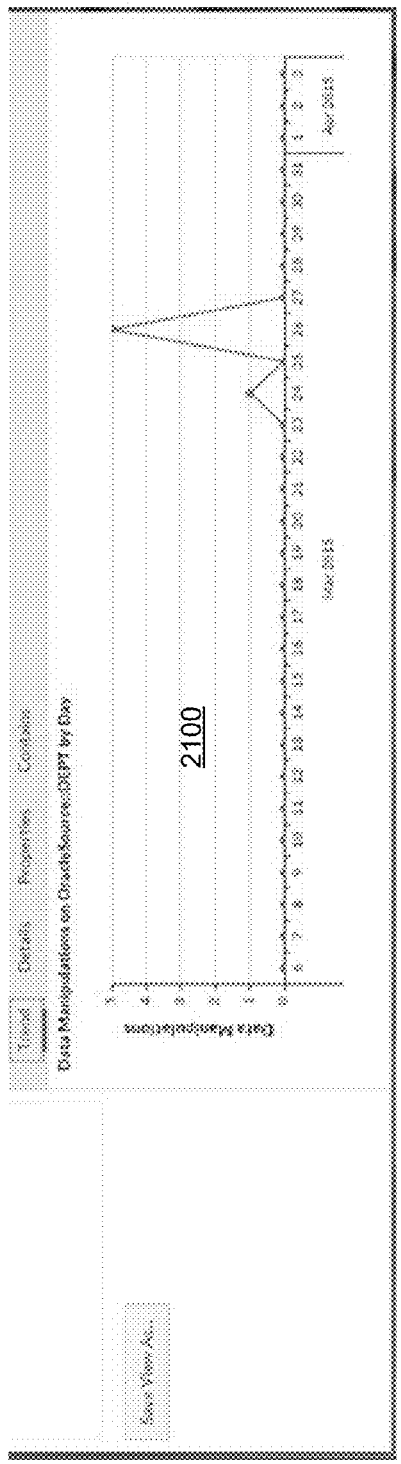
FIG. 21 illustrates another example Trend tab according to an embodiment.

The UI in FIG. 20 shows that the two tables DEPT and EMP in OracleSource have 6 and 5 manipulations, respectively. Clicking on the DEPT bar in the chart shows more information in the bottom area as illustrated in FIG. 21. The Trend tab shows when the data set in plot 2100 was manipulated.

Figure 22:
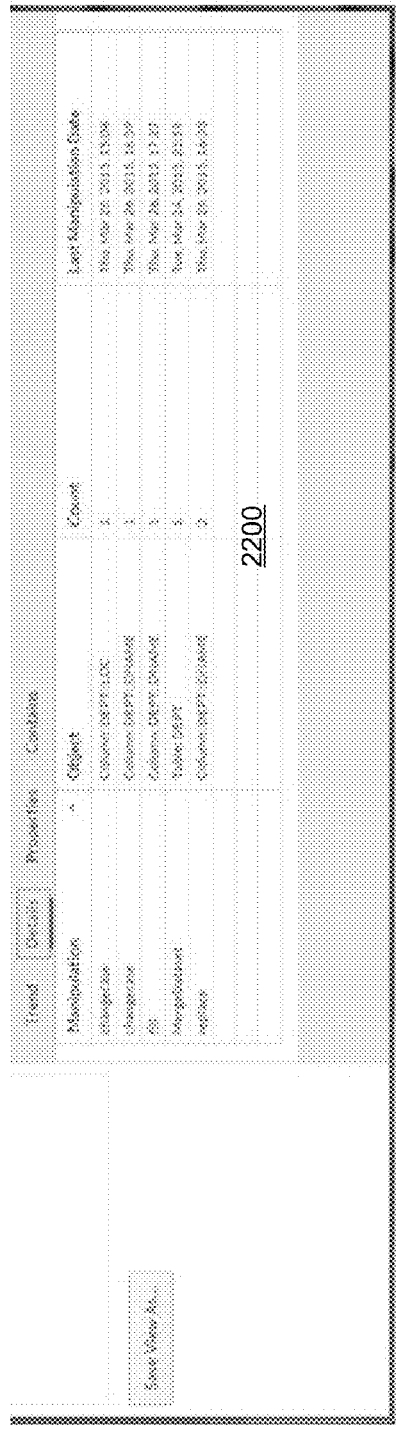
FIG. 22 illustrates another example Details tab according to an embodiment.

FIG. 22 illustrates another example Details tab. The Details tab shows information in table 2200 about the particular manipulations and what objects where modified, for example.

From the above usage statistics features, the IT user can make some conclusions about data usage based on these statistics. For example, the IT user may determine that the datasets in OracleSource have been used in more projects than those in the CSV data source, that OracleSource contains two tables EMP and DEPT that are being used by user SYSTEM in 2 projects, that if there are some changes upstream that might impact the EMP and DEPT tables, then the IT Administrator knows that there is only one downstream user (SYSTEM) that would be affected, that if OracleSource has other tables, they have not been relevant to any users because there is no reported activity for them, that the data usage occurred at the end of March, possibly indicating temporal usage patterns for the dataset that affects how the IT Administrator does her job, or that the BA made a number of manipulations on the DNAME column in the DEPT table (changecase, fill, replace) which may indicate that the DNAME values are problematic as it originally appeared in the dataset, and thus the IT Administrator might look into correcting the DNAME values before it is imported into DP, so that the BA doesn't have to do the same work.

Figure 23:
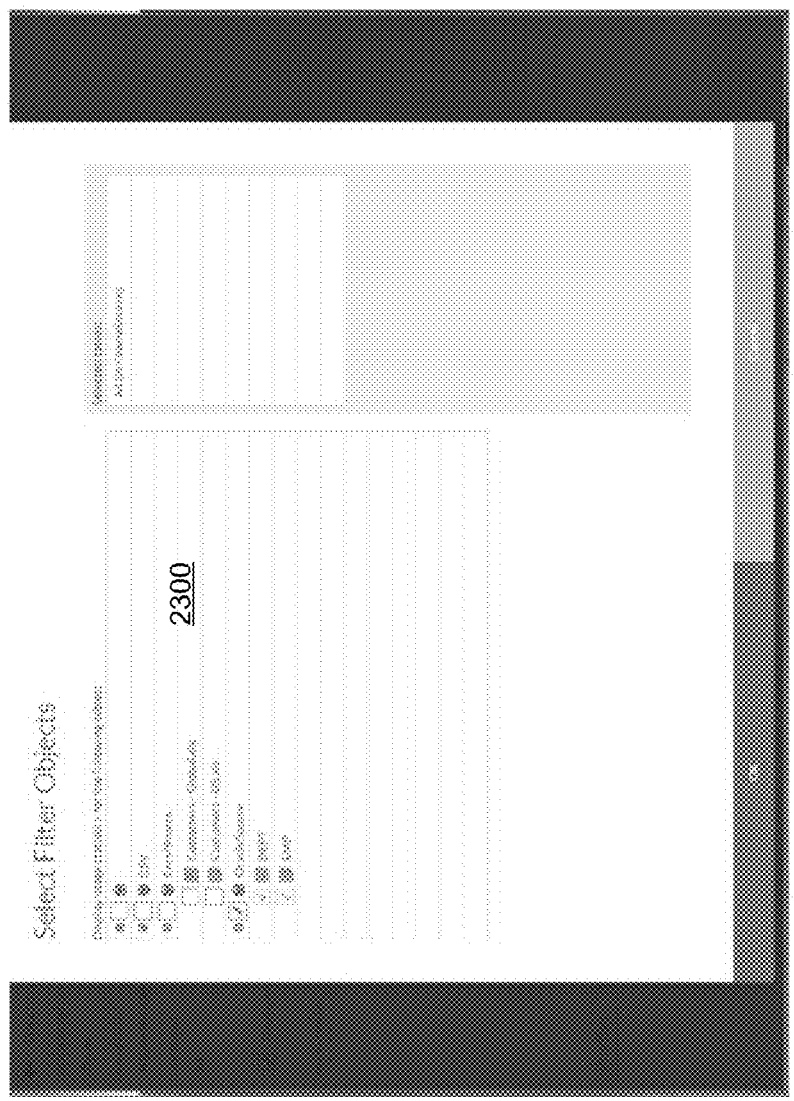
FIG. 23 illustrates object filtering according to an embodiment.

FIG. 23 illustrates object filtering according to an embodiment. In this example, the system may show data usage statistics for all objects or just selected objects (e.g., data sources, tables, etc.). For example, the user can limit the view by setting a filter 2300 on items of interest. The filter is embodied in a query against data in statistics data structure and associated data, for example.

Example Hardware

Figure 24:
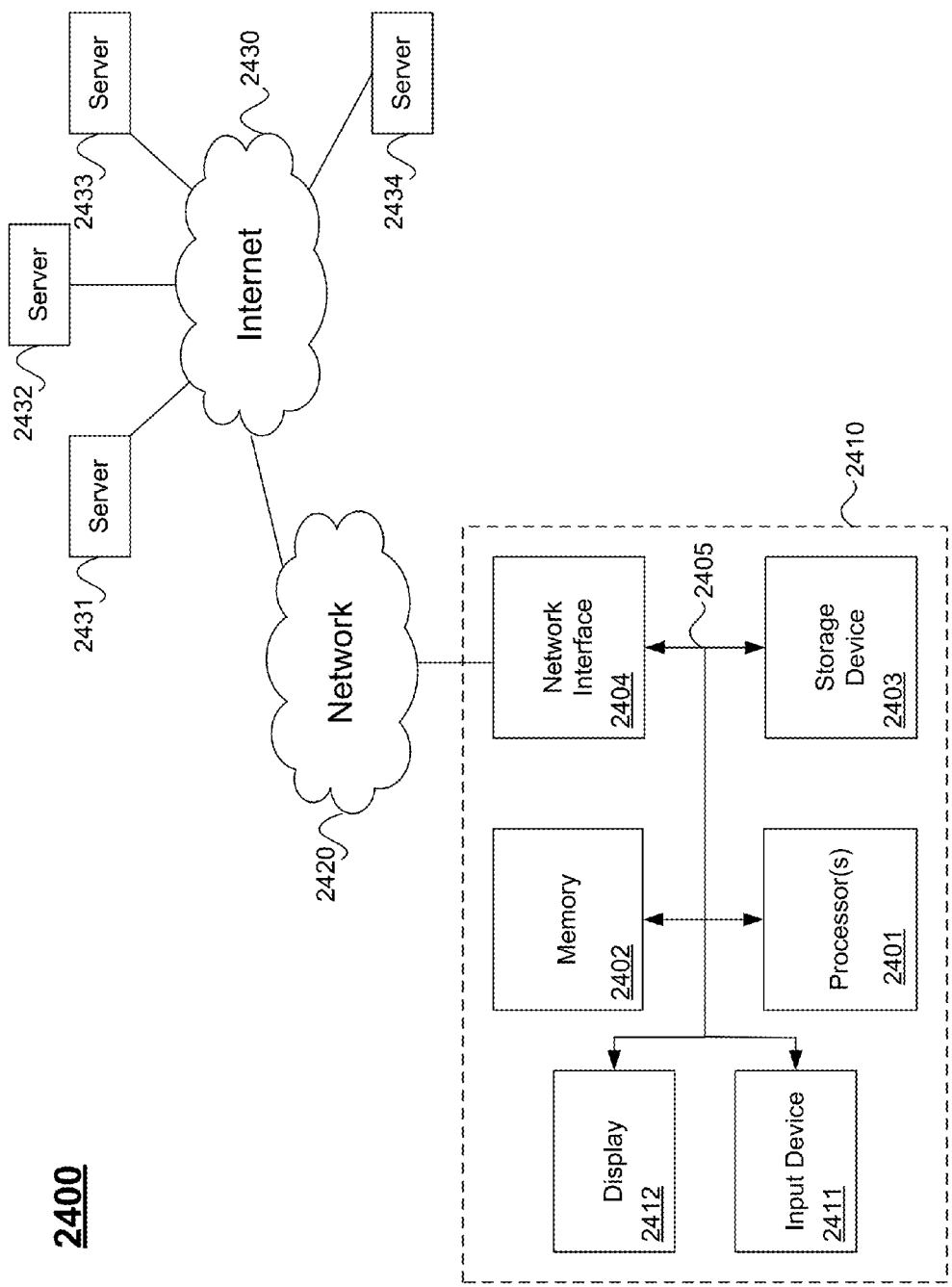
FIG. 24 illustrates hardware of a special purpose computing machine configured with a process according to the above disclosure.

FIG. 24 illustrates hardware of a special purpose computing machine configured with a process according to the above disclosure. The following hardware description is merely one example. It is to be understood that a variety of computers topologies may be used to implement the above described techniques. An example computer system 2410 is illustrated in FIG. 24. Computer system 2410 includes a bus 2405 or other communication mechanism for communicating information, and one or more processor(s) 2401 coupled with bus 2405 for processing information. Computer system 2410 also includes a memory 2402 coupled to bus 2405 for storing information and instructions to be executed by processor 2401, including information and instructions for performing some of the techniques described above, for example. This memory may also be used for storing programs executed by processor(s) 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 2403 may include source code, binary code, or software files for performing the techniques above, for example. Storage device and memory are both examples of non-transitory computer readable storage mediums.

Computer system 2410 may be coupled via bus 2405 to a display 2412 for displaying information to a computer user. An input device 2411 such as a keyboard, touchscreen, and/or mouse is coupled to bus 2405 for communicating information and command selections from the user to processor 2401. The combination of these components allows the user to communicate with the system. In some systems, bus 2405 represents multiple specialized buses, for example.

Computer system 2410 also includes a network interface 2404 coupled with bus 2405. Network interface 2404 may provide two-way data communication between computer system 2410 and a network 2420. The network interface 2404 may be a wireless or wired connection, for example. Computer system 2410 can send and receive information through the network interface 2404 across a local area network, an Intranet, a cellular network, or the Internet, for example. In the Internet example, a browser, for example, may access data and features on backend systems that may reside on multiple different hardware servers 2431-2434 across the network. Hardware servers 2431-2434 and server software may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a user triggered input to perform an action on a spreadsheet comprising data, wherein the action corresponds to a manipulation of spreadsheet data selected by the user;
automatically generating, based on the action, one or more data flow objects corresponding to the action;
automatically producing a data flow graph comprising said one or more data flow objects corresponding to the action;
executing the data flow graph, wherein the data flow graph receives the data and produces a modified data; and
displaying the modified data to the user in the spreadsheet.

2. The method of claim 1 further comprising:
storing the action in an action history data structure;
displaying, to the user, one or more stored actions in the action history;
receiving a user triggered input to omit the action; and
automatically producing a first modified data flow graph with said one or more data flow objects corresponding to the omitted action removed from the data flow graph; and
executing the first modified data flow graph.

3. The method of claim 2 further comprising:
displaying, to the user, one or more stored actions in the action history that have been omitted;
receiving a user triggered input to perform one or more of the omitted action; and
automatically producing a second modified data flow graph with said one or more data flow objects corresponding to the omitted action returned to the data flow graph; and
executing the second modified data flow graph.

4. The method of claim 2 wherein said storing the action step is performed after said receiving a user triggered input to perform an action step, and wherein said receiving a user triggered input to omit the action step is performed after the executing the data flow graph step and the displaying the modified data step.

5. The method of claim 2 wherein the action is stored in the action history with a time stamp to determine an order of actions in the action history.

6. The method of claim 1 further comprising storing information about the spreadsheet in a worksheet definition data structure comprising information about columns, a link to the data, and a link to the modified data.

7. The method of claim 6 wherein the worksheet definition data structure is a table.

8. The method of claim 6 wherein the worksheet definition data structure further comprises a link to virtual table, the virtual table storing information for accessing one or more remote data sources, wherein said data was received from said remote data sources.

9. The method of claim 1 wherein the data and the modified data are stored in a local memory, and wherein, after execution of the data flow graph, the data is maintain in an original state and pre-existing modified data is overwritten.

10. A computer system comprising:
one or more processors; and
a non-transitory computer readable medium having stored thereon one or more programs, which when executed by the one or more processors, causes the one or more processors to:
receive a user triggered input to perform an action on a spreadsheet comprising data;
automatically generate, based on the action, one or more data flow objects corresponding to the action;
automatically produce a data flow graph comprising said one or more data flow objects corresponding to the action;
execute the data flow graph, wherein the data flow graph receives the data and produces a modified data; and
display the modified data to the user in the spreadsheet.

11. The computer system of claim 10, wherein the one or more programs further cause the one or more processors to:
store the action in an action history data structure;
display, to the user, one or more stored actions in the action history;
receive a user triggered input to omit the action; and
automatically produce a first modified data flow graph with said one or more data flow objects corresponding to the omitted action removed from the data flow graph; and
execute the first modified data flow graph.

12. The computer system of claim 11 wherein the one or more programs further cause the one or more processors to:
display, to the user, one or more stored actions in the action history that have been omitted;
receive a user triggered input to perform one or more of the omitted action; and
automatically produce a second modified data flow graph with said one or more data flow objects corresponding to the omitted action returned to the data flow graph; and
execute the second modified data flow graph.

13. The computer system of claim 11 wherein said storing the action step is performed after said receiving a user triggered input to perform an action step, and wherein said receiving a user triggered input to omit the action step is performed after the executing the data flow graph step and the displaying the modified data step.

14. The computer system of claim 11 wherein the action is stored in the action history with a time stamp to determine an order of actions in the action history.

15. The computer system of claim 10 wherein the one or more programs further cause the one or more processors to store information about the spreadsheet in a worksheet definition data structure comprising information about columns, a link to the data, and a link to the modified data.

16. The computer system of claim 15 wherein the worksheet definition data structure is a table.

17. The computer system of claim 15 wherein the worksheet definition data structure further comprises a link to virtual table, the virtual table storing information for accessing one or more remote data sources, wherein said data was received from said remote data sources.

18. The computer system of claim 10 wherein the data and the modified data are stored in a local memory, and wherein, after execution of the data flow graph, the data is maintain in an original state and pre-existing modified data is over-written.

19. A non-transitory computer readable storage medium storing one or more programs, the one or more programs comprising instructions for:
    receiving a user triggered input to perform an action on a spreadsheet comprising data;
    automatically generating, based on the action, one or more data flow objects corresponding to the action;
    automatically producing a data flow graph comprising said one or more data flow objects corresponding to the action;
    executing the data flow graph, wherein the data flow graph receives the data and produces a modified data; and
    displaying the modified data to the user in the spreadsheet.

20. The non-transitory computer readable storage medium of claim 19, the one or more programs further comprising instructions for:
    storing the action in an action history data structure;
    displaying, to the user, one or more stored actions in the action history;
    receiving a user triggered input to omit the action; and
    automatically producing a first modified data flow graph with said one or more data flow objects corresponding to the omitted action removed from the data flow graph; and
    executing the first modified data flow graph.

* * * * *